United States Patent
Chen

(10) Patent No.: US 8,054,108 B2
(45) Date of Patent: Nov. 8, 2011

(54) TRANSMISSION DEVICE HAVING EMPHASIS FUNCTION

(75) Inventor: Wei-Yung Chen, Hsinchu County (TW)

(73) Assignee: Phison Electronics Corp., Miaoli (TW)

( * ) Notice: Subject to any disclaimer, the term of this patent is extended or adjusted under 35 U.S.C. 154(b) by 53 days.

(21) Appl. No.: 12/691,190

(22) Filed: Jan. 21, 2010

(65) Prior Publication Data

US 2011/0140742 A1   Jun. 16, 2011

(30) Foreign Application Priority Data

Dec. 16, 2009   (TW) .............................. 98143230 A

(51) Int. Cl.
*H03B 1/00* (2006.01)
*H03K 3/00* (2006.01)

(52) U.S. Cl. ........ 327/108; 327/109; 327/110; 327/111; 327/112

(58) Field of Classification Search .................. 327/108, 327/109, 112

See application file for complete search history.

(56) References Cited

U.S. PATENT DOCUMENTS 7,061,283 B1 * 6/2006 Ghia et al. .................... 327/108

* cited by examiner

*Primary Examiner* — Lincoln Donovan
*Assistant Examiner* — John Poos
(74) *Attorney, Agent, or Firm* — J.C. Patents

(57) ABSTRACT

A transmission driver including a main driving stage and a sub-driving stage is provided. The main driving stage has a main current source, and is adapted for receiving a first differential input data stream and outputting a differential output data stream by using the main current source. The sub-driving stage has two sub-current sources, and is adapted for receiving a second differential input data stream and counteracting/reducing the attenuation or distortion of the differential output data stream caused by a long transmission distance by using the sub-current sources. There is a delay of a specific bit length between the first and the second differential input data streams.

17 Claims, 5 Drawing Sheets

TRANSMISSION DEVICE HAVING EMPHASIS FUNCTION

CROSS-REFERENCE TO RELATED APPLICATION

This application claims the priority benefit of Taiwan application serial no. 98143230, filed on Dec. 16, 2009. The entirety of the above-mentioned patent application is hereby incorporated by reference herein and made a part of this specification.

BACKGROUND OF THE INVENTION

1. Field of the Invention

The present invention relates to an electronic signal transmission device, more particularly, to an electronic signal transmission device having an emphasis function.

2. Description of Related Art

With a high-speed development of semiconductor manufacturing process (a supply voltage is gradually reduced), not only sizes of devices within an integrated circuit (IC) are gradually reduced, but also transmission lines between the devices are gradually elongated and narrowed as a size of the IC is increased. Therefore, since the transmission line would cause a considerable high-frequency attenuation, not only a signal transmission quality is influenced, but also a receiving terminal/side may receive a distorted signal that cannot be interpreted/identified. Therefore, how to maintain a high-speed transmission characteristic (for example, a data transmission rate of 100 M-10 G bps) of the IC is a quite important issue in the field of the present invention.

SUMMARY OF THE INVENTION

Accordingly, the present invention is directed to an electronic signal transmission device having an emphasis function, which can improve a signal transmission quality.

The present invention provides an electronic signal transmission device including a main driving stage and a sub-driving stage. The main driving stage has a main current source coupled to a reference potential and a main operation unit coupled to the main current source and a supply voltage. The main driving stage is adapted for receiving a first differential input data stream and outputting a differential output data stream.

The sub-driving stage is coupled to the main driving stage, and has two sub-current sources and a sub-operation unit. One of the sub-current sources is coupled to the supply voltage, another one of the sub-current sources is coupled to the reference potential, and the sub-operation unit is coupled to the sub-current sources. The sub-operation unit is adapted for receiving a second differential input data stream to output an emphasis signal, so as to reduce/counteract attenuation or distortion of the differential output data stream caused by a long transmission distance, and the sub-operation unit is further adapted for receiving a bias provided by the main driving stage, so as to stabilize a common-mode voltage level of the differential output data stream.

In an embodiment of the present invention, there is a delay of a specific bit length between the first and the second differential input data streams.

In an embodiment of the present invention, the main operation unit includes two main resistors and two main transistors. One ends of the main resistors are coupled to the supply voltage. Gates of the main transistors are adapted for receiving the first differential input data stream, sources of the main transistors are respectively coupled to other ends of the main resistors for outputting the differential output data stream, and drains of the main transistors are coupled to the reference potential through the main current source.

In an embodiment of the present invention, the sub-operation unit includes two first sub-transistors and two second sub-transistors. Gates of the first sub-transistors are adapted for receiving the second differential input data stream, sources of the first sub-transistors are coupled to the supply voltage through one of the sub-current sources, and drains of the first sub-transistors are respectively coupled to the drains of the main transistors. Gates of the second sub-transistors are adapted for receiving the second differential input data stream, sources of the second sub-transistors are coupled to the reference potential through another one of the sub-current sources, and drains of the second sub-transistors are respectively coupled to the drains of the first sub-transistors.

In an embodiment of the present invention, the sub-driving stage further includes two first dimension adjusting units and two second dimension adjusting units. In this case, the sub-driving stage further includes a current detecting unit coupled to the sub-current sources, the first dimension adjusting units and the second dimension adjusting units, and is adapted for detecting currents of the sub-current sources to provide a first control signal and a second control signal, so as to control the first and the second dimension adjusting units.

In an embodiment of the present invention, the electronic signal transmission device further includes a delay circuit coupled to the sub-driving stage. The delay circuit is adapted for receiving and delaying the first differential input data stream to output the second differential input data stream.

In an embodiment of the present invention, the electronic signal transmission device further includes a current source adjusting circuit coupled to the sub-driving stage. The current source adjusting circuit is adapted for adjusting current of one of the sub-current sources, so that the currents of the sub-current sources are substantially identical.

According to the above descriptions, the electronic signal transmission device of the present invention has an emphasis function by using the sub-driving stage, so that attenuation or distortion of the differential output data stream caused by a long transmission distance can be reduced/counteracted, and accordingly a signal transmission quality is improved. On the other hand, the electronic signal transmission device of the present invention can achieve a high voltage amplitude and a high emphasis value of the differential output data stream under a low supply voltage requirement (due to an increasing delicacy of the semiconductor manufacturing process), so as to maintain a high-speed transmission characteristic of the integrated circuit (IC).

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
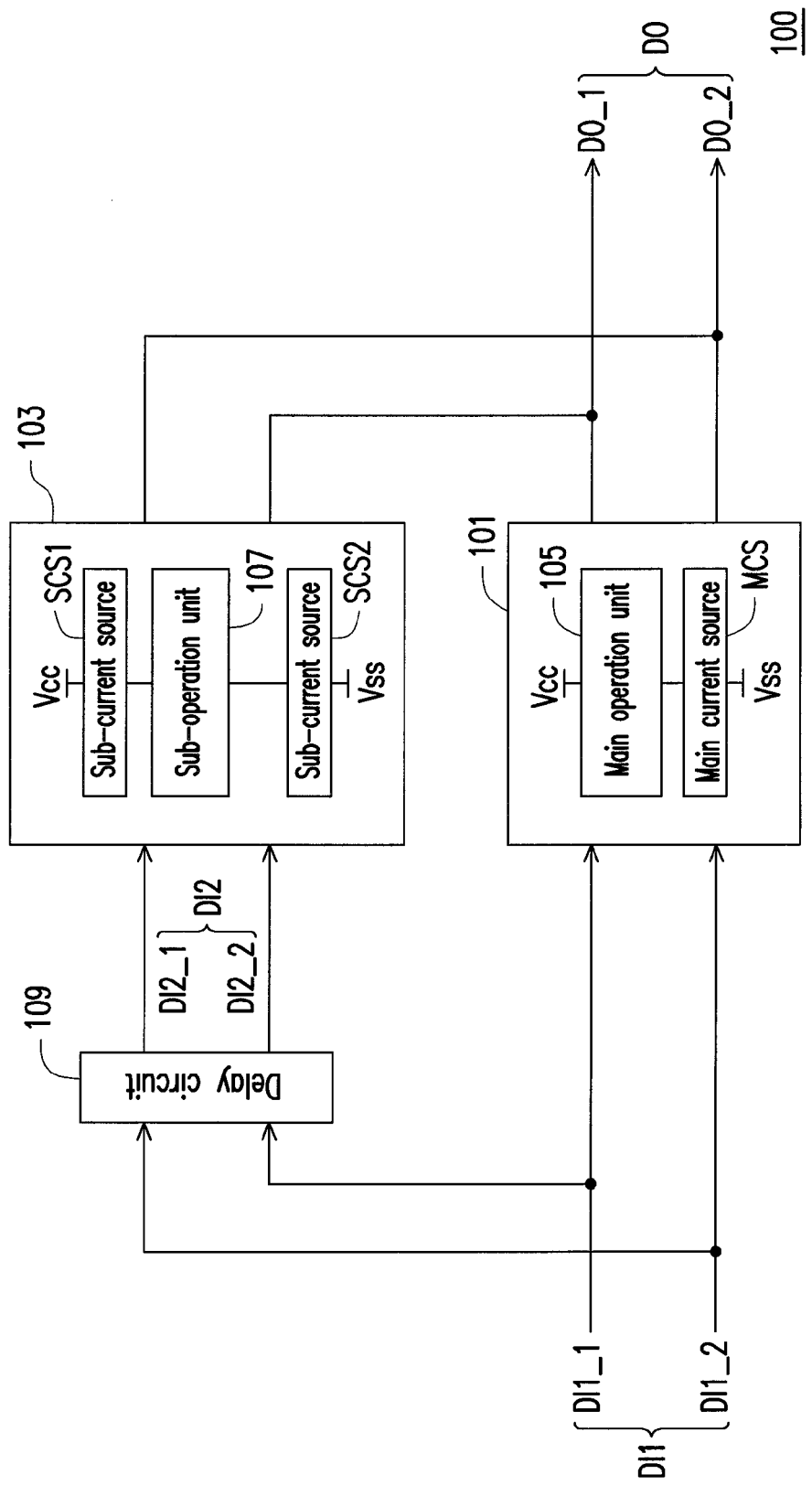
FIG. 1 is a block schematic diagram illustrating an electronic signal transmission device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts. Moreover, in the following embodiments, when a certain device is described to be connected or coupled to another device, such device can be directly connected or coupled to the other device, or can be connected, indirectly linked, electromagnetically connected, or coupled to the other device wirelessly or through at least one component.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

It is also to be noted that the notations "Vcc", "Vdd", "Vee", "Vss", etc. are only in describing voltages at various power supply terminals of exemplary circuits, and they doesn't limit types of transistors, structures of circuits, or voltage level used in the present invention.

FIG. 1 is a block schematic diagram illustrating an electronic signal transmission device 100 according to an embodiment of the present invention. Referring to FIG. 1, the electronic signal transmission device 100 can be configured as an integrated circuit package, though the present invention is not limited thereto, and the electronic signal transmission device 100 can also be configured as a transmitter or a receiver. The electronic signal transmission device 100 includes a main driving stage 101 and a sub-driving stage 103. The main driving stage 101 has a main current source MCS coupled to a reference potential Vss and a main operation unit 105 coupled to the main current source MCS and a supply voltage Vcc. The main driving stage 101 is adapted for receiving a first differential input data stream DI1 and outputting a differential output data stream DO by using the main current source MCS.

The sub-driving stage 103 is coupled to the main driving stage 101, and has two sub-current sources SCS1 and SCS2 and a sub-operation unit 107. The sub-current source SCS1 is coupled to the supply voltage Vcc, the sub-current source SCS2 is coupled to the reference potential Vss, and the sub-operation unit 107 is coupled to the sub-current sources SCS1 and SCS2.

The sub-operation unit 107 is adapted for receiving a second differential input data stream DI2, and providing a positive and a negative emphasis signals by using the sub-current sources SCS1 and SCS2, so as to reduce/counteract attenuation or distortion of the differential output data stream DO, wherein such attenuation or distortion might be caused by a long transmission distance. In the present exemplary embodiment, amplitudes of the positive and the negative emphasis signals are similar or identical. Moreover, the sub-operation unit 107 is further adapted for receiving a bias provided by the main driving stage 101, so as to stabilize a common-mode voltage level of the differential output data stream DO.

In the present exemplary embodiment, the differential input data stream DI1 has two input data streams DI1_1 and DI1_2 inverted with each other, the differential input data stream DI2 has two input data streams DI2_1 and DI2_2 inverted with each other, and the differential output data stream DO has two output data streams DO_1 and DO_2 inverted with each other. Moreover, there is a delay of a specific bit length (for example, one bit) between the differential input data streams DI1 and DI2, though the present invention is not limited thereto.

In the present exemplary embodiment, the electronic signal transmission device 100 further includes a delay circuit 109, which is adapted for receiving and delaying the differential input data stream DI1, and accordingly outputting the differential input data stream DI2.

Herein, the input data stream DI2_1 is defined to have a delay of one bit length from the input data stream DI1_2, and the input data stream DI2_2 is defined to have a delay of one bit length from the input data stream DI1_1.

For example, if the input data stream DI1_1 is represented by 10001000, a relationship between the input data streams DI1_1, DI1_2, DI2_1 and DI2_2 is shown in a following table:

| DI1_1 | 1 | 0 | 0 | 0 | 1 | 0 | 0 | 0 | — |
|---|---|---|---|---|---|---|---|---|---|
| DI1_2 | 0 | 1 | 1 | 1 | 0 | 1 | 1 | 1 | — |
| DI2_1 | D | 0 | 1 | 1 | 1 | 0 | 1 | 1 | 1 |
| DI2_1 | D | 1 | 0 | 0 | 0 | 1 | 0 | 0 | 0 |

Where, D represents a delay of one bit length.

Figure 2:
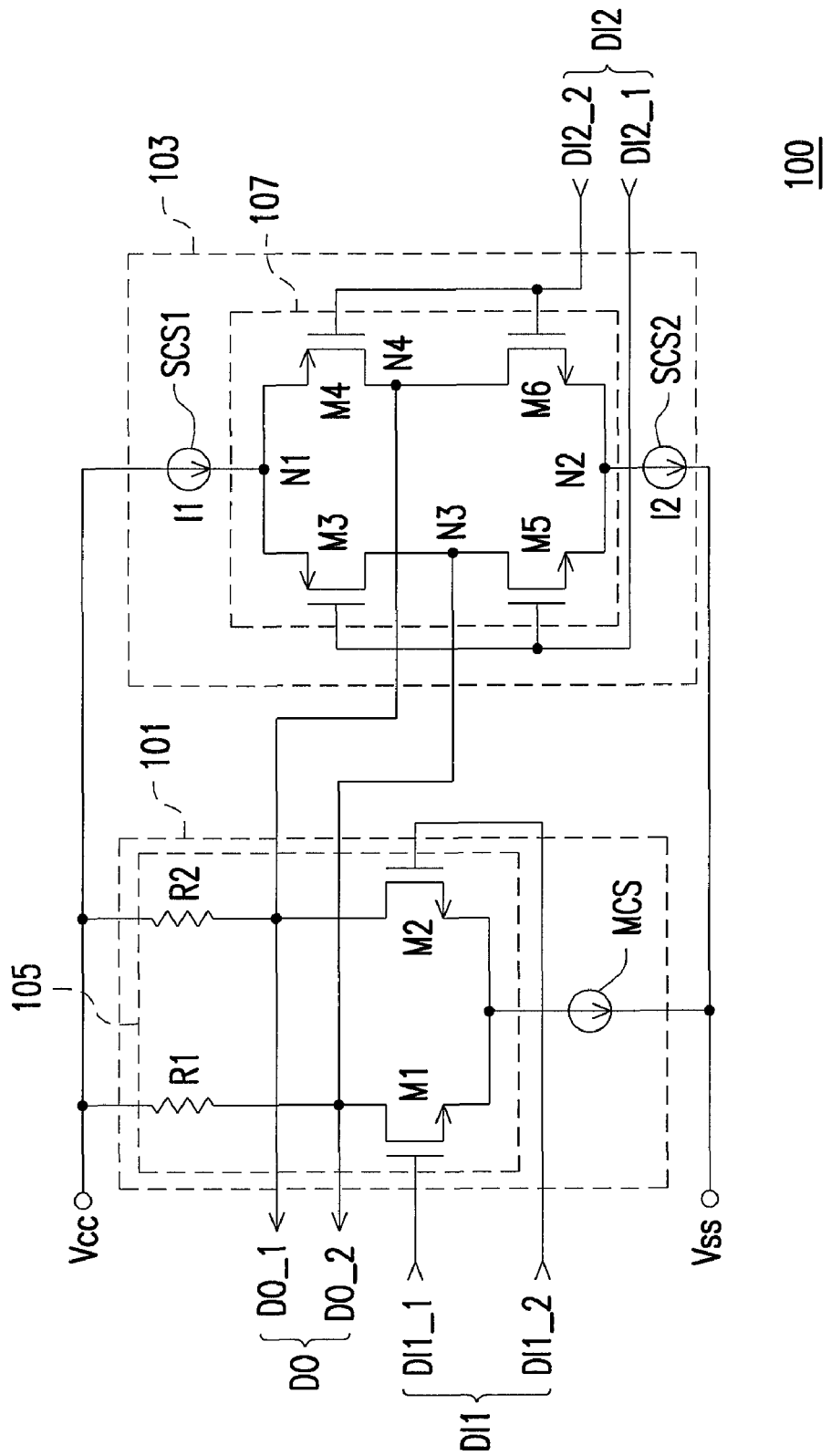
FIG. 2 is a circuit schematic diagram illustrating an electronic signal transmission device according to an embodiment of the present invention.

In detail, FIG. 2 is a circuit schematic diagram illustrating an electronic signal transmission device 100 according to an embodiment of the present invention. Referring to FIG. 1 and FIG. 2, the main driving stage 101 includes the main current source MCS and the main operation unit 105 formed by two main resistors R1, R2 and two main transistors M1 and M2. In the present exemplary embodiment, since the main transistors M1 and M2 are implemented by NMOS transistors, the main transistors M1 and M2 are referred to as NMOS transistors M1 and M2 hereinafter.

One ends of the resistors R1 and R2 are coupled to the supply voltage Vcc. Gates of the NMOS transistors M1 and M2 are adapted for receiving the first differential input data stream DI1, drains of the NMOS transistors M1 and M2 are respectively coupled to the other ends of the resistors R1 and R2 for outputting the differential output data stream DO, and sources of the NMOS transistors M1 and M2 are coupled to the reference potential Vss (for example, a ground potential, though the present invention is not limited thereto) through the main current source MCS. It should be noticed that in the present exemplary embodiment, the bias received by the sub-operation unit 107 from the main driving stage 101 is mainly a voltage drop of the main resistor R1 or the main resistor R2.

Moreover, the sub-driving stage 103 includes the sub-current sources SCS1 and SCS2, and the sub-operation unit 107 formed by two first sub-transistors M3 and M4 and two second sub-transistors M5 and M6. In the present exemplary embodiment, since the first sub-transistors M3 and M4 are implemented by PMOS transistors, and the second sub-transistors M5 and M6 are implemented by NMOS transistors, the first sub-transistors M3 and M4 are referred to as PMOS transistors M3 and M4 hereinafter, and the second sub-transistors M5 and M6 are referred to as NMOS transistors M5 and M6 hereinafter.

Gates of the PMOS transistors M3 and M4 are adapted for receiving the second differential input data stream DI2, sources of the PMOS transistors M3 and M4 are coupled to the supply voltage Vcc through the sub-current source SCS1, and drains of the PMOS transistors M3 and M4 are respectively coupled to the drains of the NMOS transistors M1 and M2. Gates of the NMOS transistors M5 and M6 are adapted for receiving the second differential input data stream DI2, sources of the NMOS transistors M5 and M6 are coupled to the reference potential Vss through the sub-current source SCS2, and drains of the NMOS transistors M5 and M6 are respectively coupled to the drains of the PMOS transistors M3 and M4.

In the present exemplary embodiment, the main current source MCS is used to determine a voltage amplitude of the differential output data stream DO, and the sub-current sources SCS1 and SCS2 are mainly used to determine emphasis values.

With a high-speed development of the semiconductor manufacturing process, the supply voltage Vcc is gradually reduced. Accordingly, in case of a lower supply voltage, since currents of the sub-current sources SCS1 and SCS2 of the sub-driving stage 103 can flow out from the supply voltage Vcc, and can flow to the reference potential Vss. Therefore, when the emphasis value is increased and when the differential output data stream DO has a high voltage amplitude, voltages of the sub-current sources SCS1 and SCS2 are not compressed much, so that the high-speed characteristic of the electronic signal transmission device 100 can be maintained, and accordingly the set emphasis value is not attenuated due to variations of the sub-current sources SCS1 and SCS2. Even if the sub-current sources SCS1 and SCS2 can not be completely symmetrical, the differential output data stream DO is less influenced.

In detail, the sub-current source SCS1 is coupled to the supply voltage Vcc, and is adapted for providing a first current I1 to a first node N1, the sub-current source SCS2 is coupled to the reference potential Vss, and is adapted for absorbing a second current I2 from a second node N2 to the reference potential Vss. The sub-driving stage 103 can provide a stable current source according to such dual current source design.

When the input data stream DI2_1 has a high logic level, and the input data stream DI2_2 has a low logic level, the transistors M4 and M5 are conducted, and now the sub-driving stage 103 can output a positive emphasis signal through an output terminal thereof. Conversely, when the input data stream DI2_1 has the low logic level, and the input data stream DI2_2 has the high logic level, the transistors M3 and M6 are conducted, and now the sub-driving stage 103 can output a negative emphasis signal through the output terminal thereof.

Since the sub-current sources SCS1 and SCS2 are relatively stable, the amplitudes of the positive emphasis signal and the negative emphasis signal provided by the sub-driving stage 103 are similar or identical. Moreover, since the sub-driving stage 103 is coupled to the main driving stage 101 through a third node N3 and a fourth node N4, stability of a common-mode voltage level of the differential output data stream DO can be adjusted according to the bias provided by the main driving stage 101.

Moreover, in the present exemplary embodiment, the transistors M3 and M4 are PMOS transistors, and the transistors M5 and M6 are NMOS transistors. In another embodiment, the transistors M3-M6 can all be NMOS transistors, the input signals of the transistors M3 and M6 are identical, and the input signals of the transistors M4 and M5 are also identical. However, the input signals of the transistors M3 and M6 are required to be inverted to the input signals of the transistors M4 and M5. Similarly, the transistors M3-M6 can also be PMOS transistors, or other type of switch devices.

Figure 3:
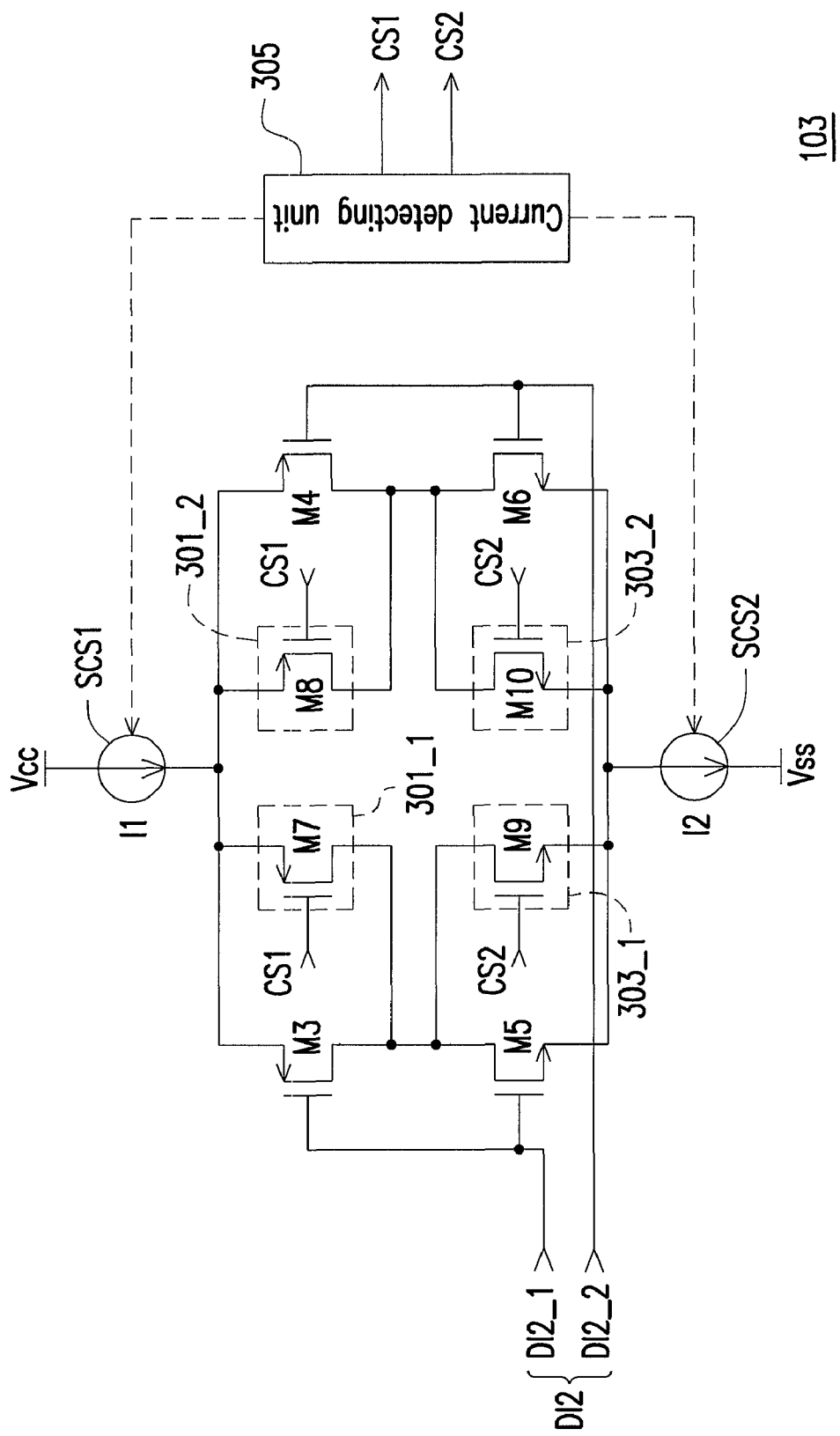
FIG. 3 is a circuit schematic diagram illustrating a sub-driving stage according to another embodiment of the present invention.

On the other hand, when the PMOS transistor M3 and M4 and the NMOS transistors M5 and M6 of the sub-driving stage 103 are quickly switched, currents can flow from the gates to the drains to increase a high-frequency jitter of the differential output data stream DO. To resolve such problem, FIG. 3 is a circuit schematic diagram illustrating a sub-driving stage 103 according to another embodiment of the present invention. Referring to FIGS. 1-3, the sub-driving stage 103 of FIG. 3 adds two first dimension adjusting units 301_1 and 301_2, two second dimension adjusting units 303_1 and 303_2, and a current detecting unit 305 compared to that of FIG. 2.

In the present exemplary embodiment, the first dimension adjusting unit 301_1 is coupled to the PMOS transistor M3 in parallel, and is controlled by a control signal CS1 provided by the current detecting unit 305; and the first dimension adjusting unit 301_2 is coupled to the PMOS transistor M4, and is controlled by the control signal CS1 provided by the current detecting unit 305. Moreover, the second dimension adjusting unit 303_1 is coupled to the NMOS transistor M5 in parallel, and is controlled by a control signal CS2 provided by the current detecting unit 305; and the second dimension adjusting unit 303_2 is coupled to the NMOS transistor and M6, and is controlled by the control signal CS2 provided by the current detecting unit 305. In detail, the first dimension adjusting unit 301_1 includes at least one third sub-transistor M7, the first dimension adjusting unit 301_2 includes at least one third sub-transistor M8, the second dimension adjusting unit 303_1 includes at least one fourth sub-transistor M9, and the second dimension adjusting unit 303_2 includes at least one fourth sub-transistor M10.

Since the third sub-transistors M7 and M8 are implemented by PMOS transistors, and the fourth sub-transistors M9 and M10 are implemented by NMOS transistors, the third sub-transistors M7 and M8 are referred to as PMOS transistors M7 and M8 hereinafter, and the fourth sub-transistors M9 and M10 are referred to as NMOS transistors M9 and M10 hereinafter.

The current detecting unit 305 is coupled to the sub-current sources SCS1 and SCS2, the first dimension adjusting units 301_1 and 301_2, and the second dimension adjusting units 303_1 and 303_2. The current detecting unit 305 is adapted for detecting the currents of the sub-current sources SCS1 and SCS2, and accordingly providing the control signals CS1 and CS2 to control the first and the second dimension adjusting units 301_1, 301_2, 303_1 and 303_2.

In the present exemplary embodiment, when the current detecting unit 305 detects that the sub-current sources SCS1 and SCS2 are increased, the current detecting unit 305 provides the control signals CS1 and CS2 to turn on the PMOS and the NMOS transistors M7-M10 (i.e. to increase dimensions of the PMOS transistors M3 and M4 and the NMOS transistors M5 and M6). Conversely, the current detecting unit 305 provides the controls signals CS1 and CS2 to turn off the PMOS and the NMOS transistors M7-M10 (i.e. to decrease dimensions of the PMOS transistors M3 and M4 and the NMOS transistors M5 and M6).

In other words, the current detecting unit 305 can provide the control signals CS1 and CS2 to switch (turn on/off) the PMOS and the NMOS transistors M7-M10 by detecting variations (increase or decrease) of the currents of the sub-current sources SCS1 and SCS2. In this way, the dimensions of the PMOS transistors M3 and M4 and the NMOS transistors M5 and M6 can be varied along with the variations of the sub-current sources SCS1 and SCS2, so as to mitigate the high-frequency jitter of the differential output data stream DO.

It should be noticed that quantities of the third sub-transistors M7 and M8 can be one or plural according to an actual design requirement. Similarly, quantities of the fourth sub-transistors M9 and M10 can also be one or plural according to an actual design requirement.

Figure 4:
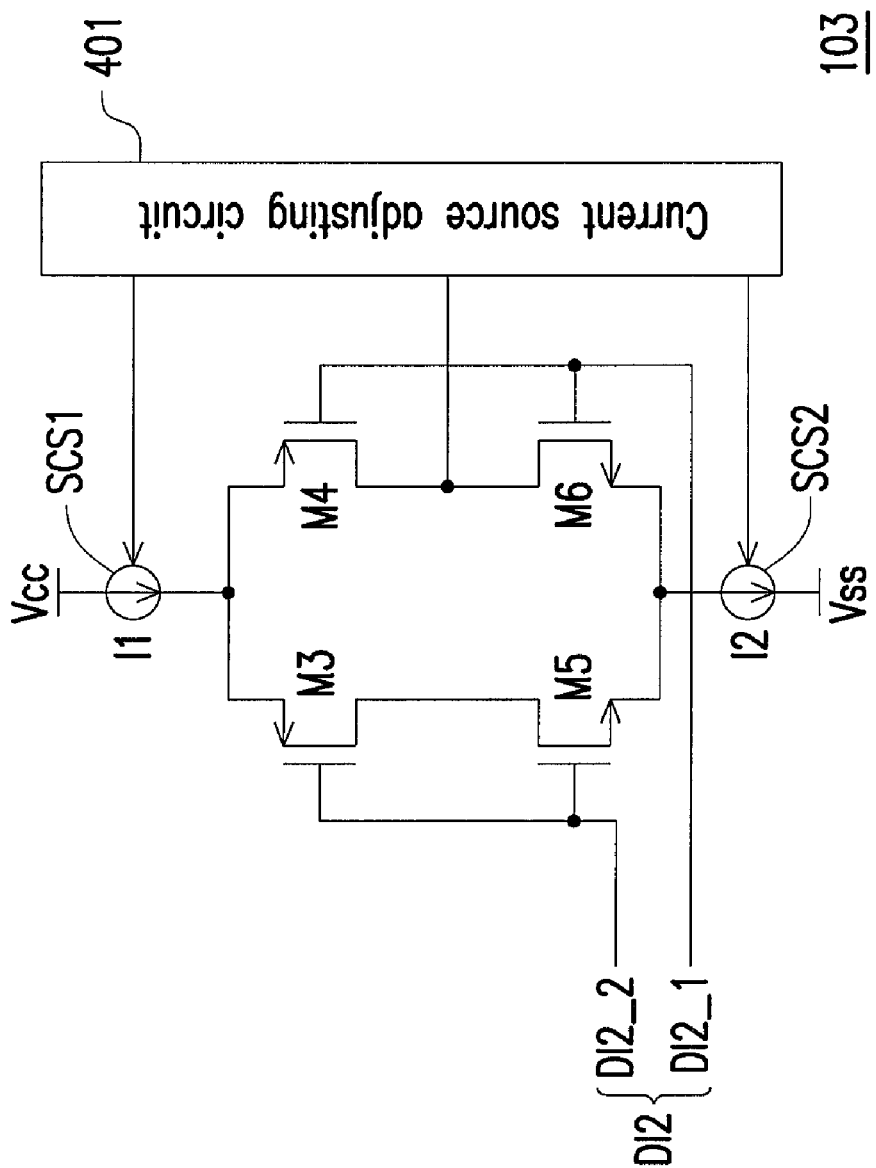
FIG. 4 is a circuit schematic diagram illustrating a sub-driving stage according to still another embodiment of the present invention.

On the other hand, FIG. 4 is a circuit schematic diagram illustrating a sub-driving stage 103 according to still another embodiment of the present invention. Referring to FIG. 1, FIG. 2 and FIG. 4, the sub-driving stage 103 of FIG. 4 adds a current source adjusting circuit 401 compared to that of FIG. 2. In the present exemplary embodiment, the current source adjusting circuit 401 is coupled to the sub-current sources SCS1 and SCS2 and the sub-operation unit 107, and is adapted for adjusting the first current I1 of the sub-current source SCS1, so that the first current I1 can be further close to the second current I2 of the sub-current source SCS2.

Figure 5:
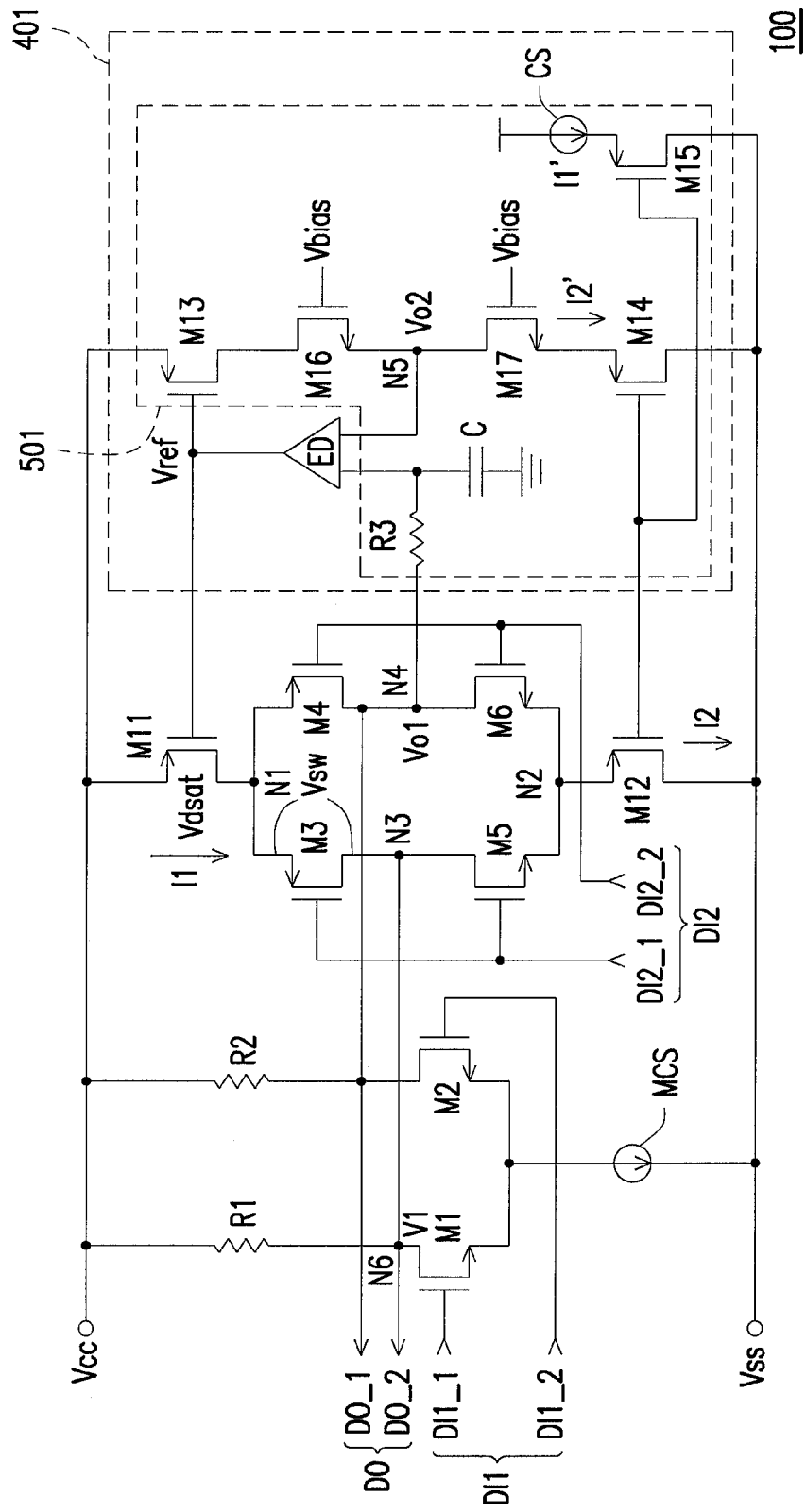
FIG. 5 is a circuit schematic diagram illustrating an electronic signal transmission device according to another embodiment of the present invention.

In detail, FIG. 5 is a circuit schematic diagram illustrating an electronic signal transmission device 100 according to another embodiment of the present invention. Referring to FIG. 4 and FIG. 5, the sub-current source SCS1 can be implemented by a PMOS transistor M11, and the sub-current source SCS2 can be implemented by a PMOS transistor M12. In the present exemplary embodiment, a source of the PMOS transistors M11 is coupled to the supply voltage Vcc, a drain of the PMOS transistor M11 is coupled to the first node N1, and a gate of the PMOS transistor M11 is adapted for receiving an adjusting voltage Vref. It should be noticed that the sub-current source SCS1 can also be formed by a current mirror circuit or other types of circuit. Moreover, a drain of the PMOS transistor M12 is coupled to the reference potential Vss, and a source of the PMOS transistor M12 is coupled to the second node N2.

The current source adjusting circuit 401 includes a voltage comparison circuit ED and an adjusting circuit 501. The voltage comparison circuit ED can be implemented by an amplifier, so that the voltage comparison circuit ED is referred to as the amplifier ED hereinafter. An output terminal of the amplifier ED is adapted for outputting the adjusting voltage Vref. Moreover, the adjusting circuit 501 includes PMOS transistors M13-M15, NMOS transistors M16 and M17, a current source CS, a resistor R3 and a capacitor C.

In the present exemplary embodiment, a source of the PMOS transistor M13 is coupled to the supply voltage Vcc, a gate of the PMOS transistor M13 is coupled to the output terminal of the amplifier ED and the gate of the PMOS transistor M11, and a drain of the PMOS transistor M13 is coupled to a drain of the NMOS transistor M16. A gate of the NMOS transistor M16 is adapted for receiving a bias Vbias, and a source of the NMOS transistor M16 is coupled to a first input terminal of the amplifier ED and a drain of the NMOS transistor M17.

A gate of the NMOS transistor M17 is coupled to a bias Vbias, and a source of the NMOS transistor M17 is coupled to a source of the PMOS transistor M14. A gate of the PMOS transistor M14 is coupled to the gates of the PMOS transistors M12 and M15, and a drain of the PMOS transistor M14 is coupled to the reference potential Vss. A source of the PMOS transistor M15 is coupled to the current source CS, and a drain of the PMOS transistor M15 is coupled to the reference potential Vss. One end of the resistor R3 is coupled to a second input terminal of the amplifier ED and one end of the capacitor C, and another end of the resistor R3 is coupled to the fourth node N4, while another end of the capacitor C is coupled to ground.

According to the above descriptions, in the present exemplary embodiment, in case that the common-mode voltage level of the differential output data stream DO is in a stable state, a voltage Vo1 of the node N4 is identical to a voltage Vo1 of the node N5 (Vo1=Vo2), currents I1=I2=I1'=I2', and the supply voltage minus a voltage V1 (a voltage of a node N6 between the transistor M1 and the resistor R1) is equal to a voltage Vdsat (a saturation voltage of the transistor M11) plus a voltage Vsw (a drain-source voltage of the transistor M3), i.e. (Vcc−V1)=(Vdsat+Vsw).

However, in case that the common-mode voltage level of the differential output data stream DO is unstable, since the voltage V1 is increased, a value of Vcc−V1 is decreased, so that Vcc−V1 would be less than Vdsat+Vsw, i.e. (Vcc−V1)<(Vdsat+Vsw). Therefore, the current I1 is accordingly decreased. Now, since the amplifier ED can compare that the voltage Vo1 is not equal to the voltage Vo2 (i.e. Vo1≠Vo2), the adjusting voltage Vref output from the output terminal of the amplifier ED is accordingly decreased, so as to increase a current value of the current I1. In this way, the first current I1 can be adjusted to be further close to the second current I2, so as to calibrate the positive and the negative emphasis signals and the common-mode voltage level of the differential output data stream DO.

In summary, in the electronic signal transmission device of the present invention, since the sub-driving stage has two sub-current sources with a current flow direction from the supply voltage to the reference potential, the positive and negative emphasis signals can be provided to reduce/counteract the attenuation or distortion of the differential output data stream, so as to improve a signal transmission quality. Wherein, the amplitudes of the positive and negative emphasis signals are similar or identical, and the sub-driving stage 103 receives a bias provided by the main driving stage 101, so as to stabilize the common-mode voltage level of the differential output data stream DO.

On the other hand, the electronic signal transmission device of the present invention can achieve a high voltage amplitude and a high emphasis value of the differential output data stream under a low supply voltage requirement (due to an increasing delicacy of the semiconductor manufacturing process), so as to maintain a high-speed transmission characteristic of the integrated circuit (IC), for example, a data transmission rate of 2 G-10 G bps, though the present invention is not limited thereto.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic signal transmission device, comprising:
a main driving stage, having a main current source coupled to a reference potential and a main operation unit coupled to the main current source and a supply voltage, the main driving stage being adapted for receiving a first differential input data stream and outputting a differential output data stream; and
a sub-driving stage, coupled to the main driving stage, and having two sub-current sources and a sub-operation unit, wherein one of the sub-current sources is coupled to the supply voltage, another one of the sub-current sources is coupled to the reference potential, and the sub-operation unit is coupled to the sub-current sources, and is adapted for receiving a second differential input data stream to output an emphasis signal, so as to reduce attenuation or distortion of the differential output data stream, and the sub-operation unit is further adapted for receiving a bias provided by the main driving stage, so as to stabilize a common-mode voltage level of the differential output data stream,
wherein there is a delay of a specific bit length between the first and the second differential input data streams,
wherein the main operation unit comprises:
two main passive-resistors, having one ends coupled to the supply voltage without passing through any current source; and
two main transistors, having gates receiving the first differential input data stream, drains respectively coupled to other ends of the main resistors for outputting the differential output data stream, and sources coupled to the reference potential through the main current source.

2. The electronic signal transmission device as claimed in claim 1, wherein the sub-operation unit comprises:
two first sub-transistors, having gates receiving the second differential input data stream, sources coupled to the supply voltage through one of the sub-current sources, and drains respectively coupled to the drains of the main transistors; and
two second sub-transistors, having gates receiving the second differential input data stream, sources coupled to the reference potential through another one of the sub-current sources, and drains respectively coupled to the drains of the first sub-transistors.

3. The electronic signal transmission device as claimed in claim 2, wherein the main transistors and the second sub-transistors are NMOS transistors, and the first sub-transistors are PMOS transistors.

4. The electronic signal transmission device as claimed in claim 2, wherein the sub-driving stage further comprises:
two first dimension adjusting units, respectively coupled to the first sub-transistors in parallel, and controlled by a first control signal; and
two second dimension adjusting units, respectively coupled to the second sub-transistors in parallel, and controlled by a second control signal.

5. The electronic signal transmission device as claimed in claim 4, wherein the sub-driving stage further comprises:
a current detecting unit, coupled to the sub-current sources, the first dimension adjusting units and the second dimension adjusting units, for detecting currents of the sub-current sources to provide the first control signal and the second control signal, so as to control the first and the second dimension adjusting units.

6. The electronic signal transmission device as claimed in claim 4, wherein the first dimension adjusting units respectively comprise at least one third sub-transistor, and the second dimension adjusting units respectively comprise at least one fourth sub-transistor.

7. The electronic signal transmission device as claimed in claim 6, wherein the current detecting unit provides the first and the second control signals to turn on the third and the fourth sub-transistors when detecting that the sub-current sources are increased.

8. The electronic signal transmission device as claimed in claim 6, wherein the current detecting unit provides the first and the second control signals to turn off the third and the fourth sub-transistors when detecting that the sub-current sources are decreased.

9. The electronic signal transmission device as claimed in claim 6, wherein the third sub-transistors are PMOS transistors, and the fourth sub-transistors are NMOS transistors.

10. The electronic signal transmission device as claimed in claim 1, further comprising:
a delay circuit, coupled to the sub-driving stage, for receiving and delaying the first differential input data stream to output the second differential input data stream.

11. The electronic signal transmission device as claimed in claim 1, wherein the specific bit length comprises at least one bit.

12. The electronic signal transmission device as claimed in claim 2, wherein the sub-driving stage further comprises:
a current source adjusting circuit, coupled to the sub-driving currents and the sub-operation unit, for adjusting current of one of the sub-current sources, so that the currents of the sub-current sources are substantially identical.

13. The electronic signal transmission device as claimed in claim 12, wherein the current source adjusting circuit comprises:
a voltage comparison circuit, for comparing a first voltage and a second voltage to provide an adjusting voltage; and
an adjusting circuit, coupled to the voltage comparison circuit, for adjusting the current of one of the sub-current sources according to the adjusting voltage.

14. The electronic signal transmission device as claimed in claim 13, wherein the sub-current sources respectively comprise a first transistor and a second transistor,
wherein a gate of the first transistor is adapted for receiving the adjusting voltage, a source of the first transistor is coupled to the supply voltage, and a drain of the first transistor is coupled to the sources of the first sub-transistors; and
a source of the second transistor is coupled to the sources of the second sub-transistors, and a drain of the second transistor is coupled to the reference potential.

15. The electronic signal transmission device as claimed in claim 14, wherein the voltage comparison circuit comprises an amplifier, and an output terminal of the amplifier is coupled to the gate of the first transistor, and is adapted for outputting the adjusting voltage.

16. The electronic signal transmission device as claimed in claim 15, wherein the adjusting circuit comprises:
a third transistor, having a source coupled to the supply voltage, and a gate coupled to the output terminal of the amplifier;
a fourth transistor, having a gate receiving a bias, a drain coupled to a drain of the third transistor, and a source coupled to a first input terminal of the amplifier;

a fifth transistor, having a gate receiving a bias, and a drain coupled to the source of the fourth transistor for generating the second voltage;

a sixth transistor, having a gate coupled to the gate of the second transistor, a drain coupled to a source of the fifth transistor, and a source coupled to the reference potential;

a current source;

a seventh transistor, having a gate coupled to the gate of the second transistor, a drain coupled to the current source, and a source coupled to the reference potential;

a resistor, having one end coupled to the drain of one of the first sub-transistors and the drain of one of the second sub-transistors for generating the first voltage, and another end coupled to a second input terminal of the amplifier; and a capacitor, having one end coupled to the second input terminal of the amplifier, and another end coupled to ground.

17. The electronic signal transmission device as claimed in claim 16, wherein the first, the second, the third, the sixth and the seventh transistors are PMOS transistors, and the fourth and the fifth transistors are NMOS transistors.

* * * * *